Patented Apr. 6, 1937

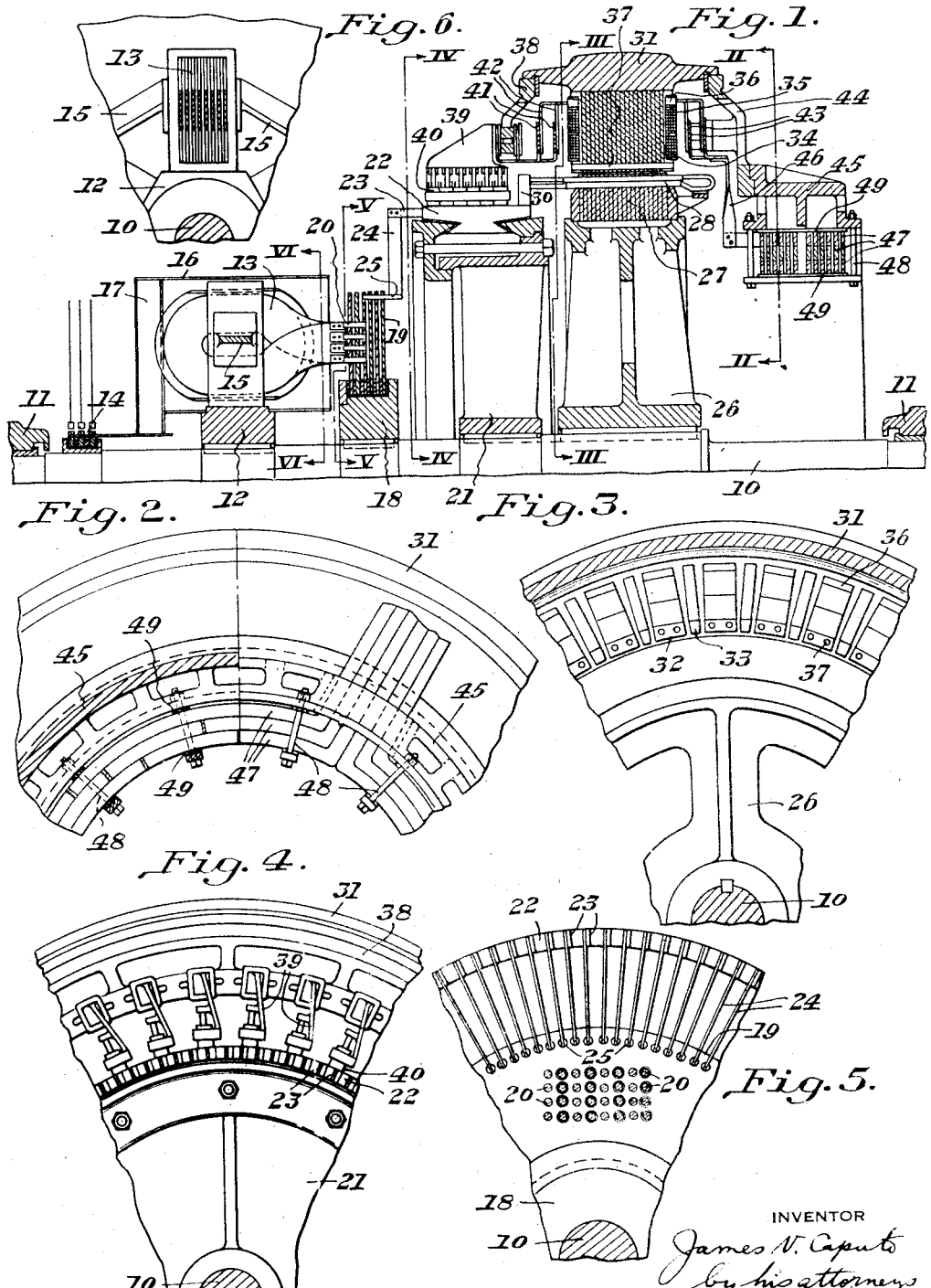

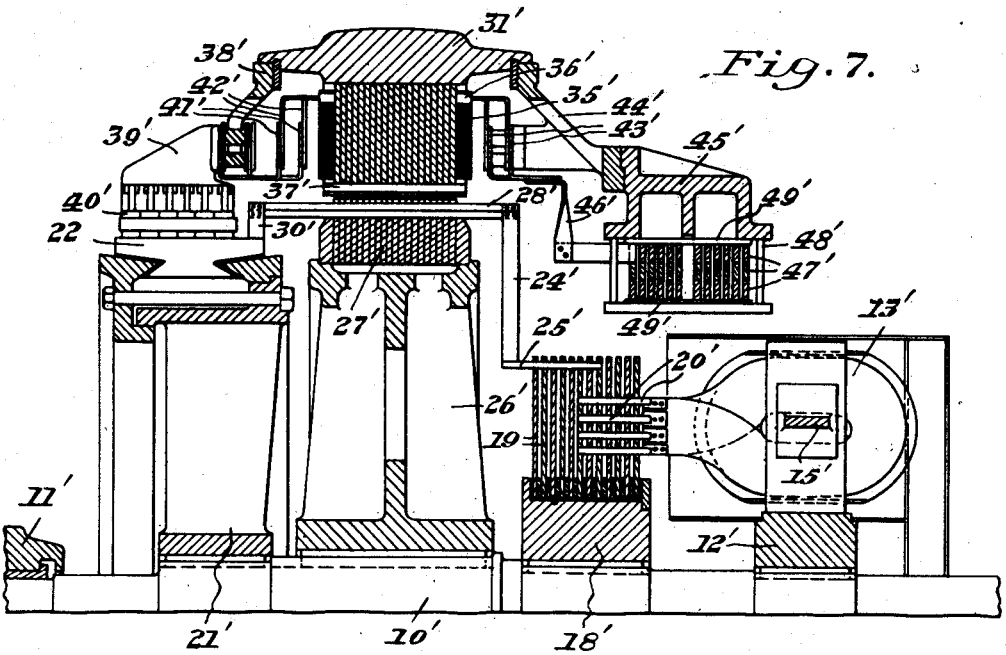
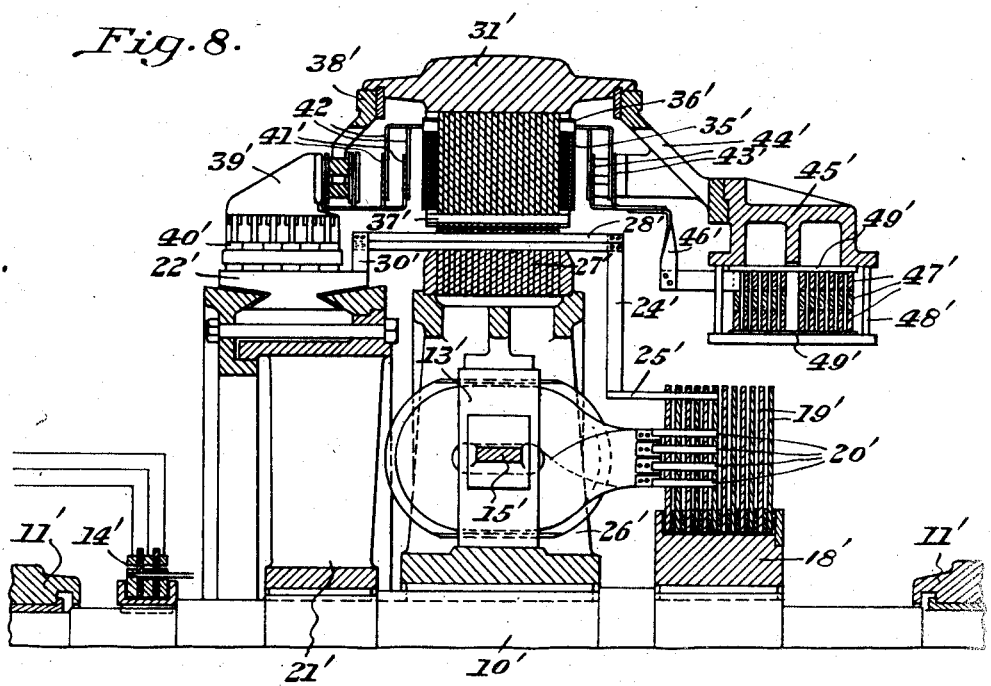

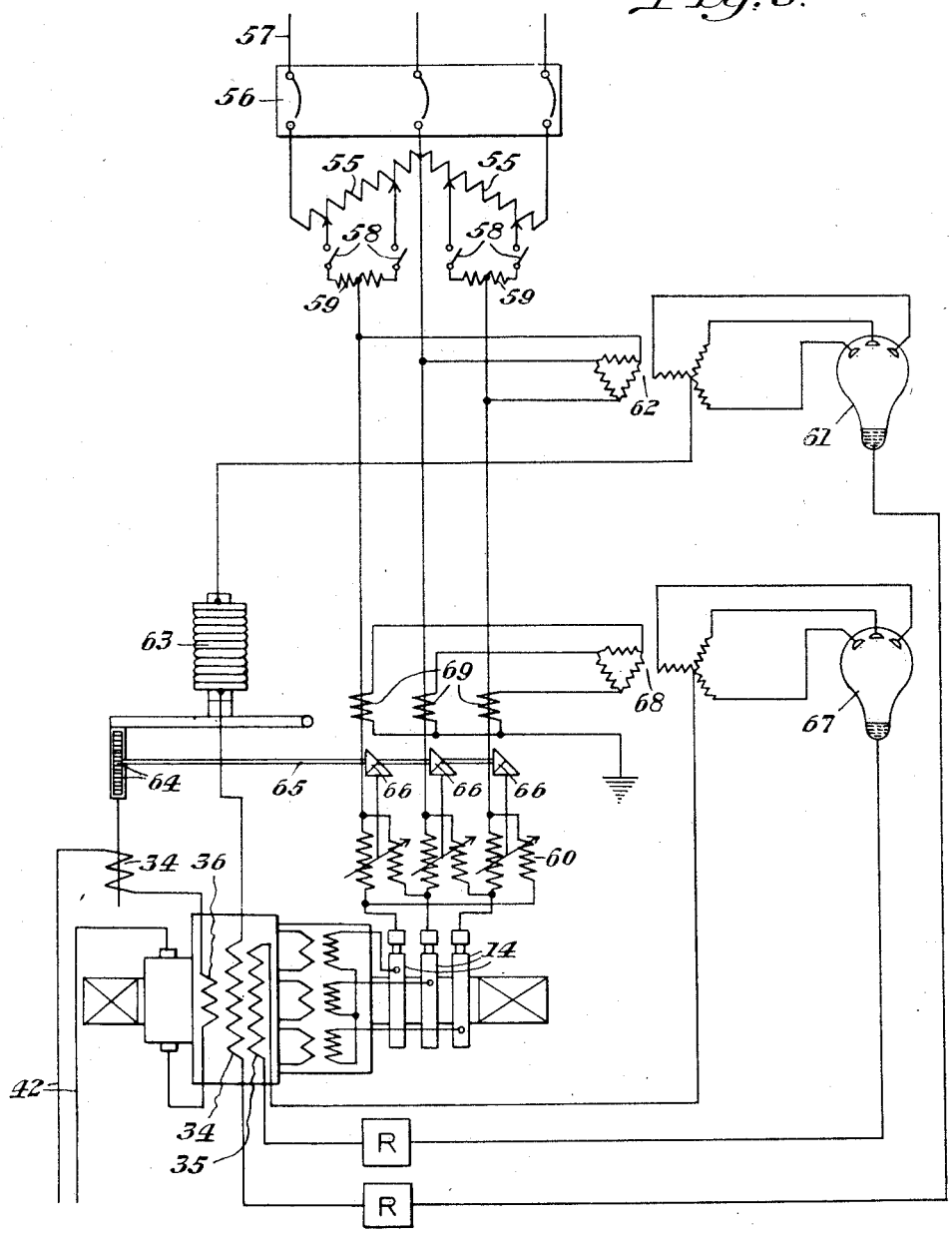

2,076,365

UNITED STATES PATENT OFFICE 2,076,365

DIRECT CURRENT SUPPLY SYSTEM

James V. Caputo, Girard, Ohio

Application September 30, 1933, Serial No. 691,687

8 Claims. (Cl. 171—123)

My invention relates to an energy conversion system and, in particular, to a system for supplying direct currents of large magnitude at low voltage, such as are utilized industrially in electric welding and electrolytic processes.

It has long been conceded that direct current is practically ideal for electric welding and it is, of course, essential for electrolytic work. No satisfactory system has been proposed heretofore, so far as I am aware, for supplying direct currents of large magnitude at low voltage for industrial processes. It has been proposed heretofore to utilize commutator-type generators. It has been thought, however, that separate excitation of such generators is essential for successful operation.

I have invented a novel apparatus and system for providing a dependable supply of direct current of large magnitude at low voltage, which is characterized by a high efficiency and is thus a marked improvement over apparatus of this sort known heretofore, which was characterized by excessive losses and correspondingly low efficiency. In accordance with my invention, I utilize the principle of the rotary converter but modify the conventional structure thereof to adapt it to the requirements of the special service above mentioned. In order to supply to the converter the large alternating currents which are involved in the generation of high-amperage direct currents, without the excessive losses by which the apparatus of the prior art has been characterized, I mount the transformers supplying the converter on the shaft of the latter for rotation. Only the small alternating currents of high voltage which are supplied to the primary windings of the transformer, need be conducted through sliding connections, such as slip rings and brushes. This arrangement is obviously much more efficient than supplying heavy alternating currents from the secondary windings of the transformer to the converter through such connections. Other features of novelty characterizing my invention will become apparent as the detailed description thereof proceeds.

For a complete understanding of the invention, reference should be had to the accompanying drawings illustrating a present preferred embodiment and certain modifications thereof. In the drawings:

Figure 1 is a partial section taken on an axial plane through the apparatus of my invention;

Figure 2 is a partial section along the line II—II of Figure 1;

Figure 3 is a partial section along the line III—III of Figure 1;

Figure 4 is a partial section along the line IV—IV of Figure 1;

Figure 5 is a partial section along the line V—V of Figure 1;

Figure 6 is a partial section along the line VI—VI of Figure 1;

Figure 7 is a view similar to Figure 1 showing a modified form of construction;

Figure 8 is another view similar to Figure 1 showing a further modified form of construction; and Figure 9 is a circuit diagram illustrating one manner of utilizing the invention to produce low-voltage, direct current of large magnitude from a high-voltage, alternating current source.

Referring now in detail to the drawings and, for the present, to Figures 1 through 6, a shaft 10 is mounted in bearings 11. A spider 12 keyed to the shaft 10 provides a mounting for a plurality of transformers 13. The primary windings of the transformers are supplied with high-voltage, alternating current through brushes and slip rings indicated generally at 14. Braces 15 extend between and are secured to adjacent transformers. The transformers are enclosed in housings 16 and vanes 17 mounted thereon induce a flow of current through the housings.

A spider 18 is also keyed to the shaft 10. Conducting rings 19 are mounted on the spider 18 in spaced relation, and are insulated from each other and the spider. The secondary windings of the transformers 13 have terminals 20 extending axially through certain of the rings 19 and insulated therefrom, the terminals of the two ends of each secondary winding being in electrical conducting engagement with two adjacent rings of opposite polarity.

A spider 21 keyed to the shaft 10 carries a commutator 22 of the usual type. Connectors 23 extend axially from the commutator bars. Risers 24 are secured to the connectors and have terminals 25 attached thereto similar to those shown at 20. Like the terminals 20, the terminals 25 extend through certain of the rings 19 in insulated relation thereto and are electrically connected to one of the rings.

A yoke 26 keyed to the shaft carries a drum armature having a core 27 and coils 28 embedded therein. The coils 28 are connected to the commutator bars through usual risers 30. A magnetic yoke 31 having main poles 32 and interpoles 33 surrounds the armature. The main poles have main shunt windings 34, compound shunt windings 35, and compound series windings 36. A squirrel-cage winding 37 is embedded in the faces of the main poles 32.

A brush-holder ring 38 is adjustably secured to the side of the yoke 31 adjacent the commutator 22. Brush holders 39 are secured to but insulated from the ring 38. Each brush holder 39 carries a plurality of brushes 40 engaging the commutator 22. Equalizer rings 41 extend around the machine within the ring 38. Brush holders 39 of alternating polarity are in electrically conducting engagement with the equalizer rings of corresponding polarity. Connections 42 extend from the equalizer rings to the series windings 36 and thence to an additional pair of equalizer rings 43 on the opposite side of the machine. The equalizer rings 43 are attached to but insulated from a supporting ring 44 similar to the brush-holder ring 38. The supporting ring 44 carries a terminal housing 45. Connections 46 extend axially and radially from the equalizer rings 43 to a plurality of terminal leads 47 extending around the shaft 10 within the housing 45, secured thereto by bolts 48 but spaced therefrom by insulation 49. Successive connections 46 around the circumference of the machine are secured to terminal conductors 47 spaced at increasing distances from the armature of the machine, adjacent leads 47 having opposite polarity. The terminal leads extend radially from the housing 45, as shown in Figure 2, in any desired direction to carry the current to the load.

Figure 7 illustrates a modified form of construction which is similar in general to that of Figures 1 through 6. Corresponding elements thereof are indicated by the same reference numerals with a prime affixed thereto. The difference between the embodiments of the invention illustrated in Figures 1 and 7 is that in the latter, the transformers 13' are mounted on the opposite side of the machine from the commutator. The risers 24' are, therefore, connected to the ends of the armature coils 28' on the opposite side from the commutator instead of to the commutator itself. The construction of the machine of Figure 7 is, however, otherwise practically the same as that of Figure 1.

Figure 8 shows a further modification which is only slightly different from that of Figure 7. In Figure 8, the transformers 13' are positioned within the spider 26' instead of in axially spaced relation thereto. Obviously, this construction is very compact. Except for the above-mentioned difference, it is substantially the same as the construction of Figure 7.

Figure 9 illustrates a schematic diagram of connections for a typical installation of the invention. High-voltage, alternating current is supplied to the brushes and slip rings 14 from transformers 55 connected in open delta, through a switch 56, to a supply circuit 57. The transformers 55 are equipped for tap changing under load by switches 58 and auto-transformers 59. An induction regulator 60 is connected between the transformers 55 and the slip rings and brushes 14. The combination of the tap changing transformers and the induction regulator permits any desired voltage to be applied to the slip rings. This permits the supply of direct current at any desired voltage within a wide range.

The excitation for the main shunt field winding 34 may conveniently be obtained from a rectifier 61, which is supplied by a transformer 62 connected across the transformers 55. The exciting current traversing the winding 34 may be controlled by a carbon-pile rheostat 63 operated by a relay 34 in series with the direct current load circuit. The relay 34, furthermore, by means of a rack and pinion 64, a shaft 65 and gearing 66, controls the adjustment of the induction regulator 60 to maintain a constant voltage and current on the direct current side. The series winding 36, of course, is connected in series with the relay 34 and the terminal leads 47.

The shunt compound winding 35 is energized by the output of a rectifier 67, which is connected across a transformer 68. The transformer 68 is supplied by current transformers 69 in the main connections between the supply circuit and the induction regulator 60. The energization of the field winding 35 is thus proportional to the current supplied to the converter.

It will be apparent from the foregoing description that the invention is characterized by numerous advantages over the systems and apparatus of the prior art for supplying direct current of large magnitude at low voltage. In the first place, the system permits a very nice control of the direct-current voltage. The maintenance of a constant, direct-current voltage, or even a voltage which increases with load, if desired, is insured by the compound excitation and the automatic control of the main shunt field. The losses incident to the transmission of the large alternating currents necessary to supply energy to the converter are materially reduced by placing the transformers on the shaft of the converter and connecting the transformer secondaries to the converter armature by short connections which are interleaved so as to reduce reactance. The interleaving of the inductors reduces the so-called alternating-current resistance thereof to approximately the value of the direct-current resistance. In other words, the non-uniform distribution of the current resulting from skin effect is minimized. At the same time, the construction of the converter is characterized by all the desirable features known to modern engineering practice. A machine of the type shown can successfully be operated with self-excitation. The disposition of the terminal leads on the opposite side of the machine from the commutator is an advantage in that it simplifies construction and makes possible a design which is symmetrical electrically and mechanically.

Although I have illustrated herein but a few modifications of the invention, it will be obvious that numerous changes in the system and apparatus described and illustrated may be made without departing from the spirit of the invention or the scope of the appended claims.

I claim:

1. The combination with a rotary converter having a field winding and being adapted for connection to an alternating-current supply source, of a source of excitation for said winding comprising a series transformer connected between the converter and said supply source, and a rectifier energized by said transformer and supplying its output to said winding.

2. In a rotary converter, a stationary yoke, a shaft coaxial therewith, an armature mounted on the shaft for rotation within said yoke, a commutator on said shaft, a transformer mounted on said shaft for rotation with said armature and commutator, and connections between said transformer and armature including a plurality of flat discs disposed edgewise on the shaft and rotating therewith, and connections from the rings to the transformer windings and to said commutator, said connections including terminals extending axially through said discs, insulated from some of them and in conducting engagement with at least one of them.

3. Apparatus as set forth in claim 2 characterized by the fact that such connections also include pairs of equalizer rings extending around the yoke on opposite sides thereof.

4. A dynamo-electric machine comprising a yoke, a shaft coaxial therewith, an armature disposed on the shaft for rotation within the yoke, a plurality of transformers on the shaft, and a plurality of flat, annular interconnecting rings disposed edgewise on the shaft, the secondary windings of the transformers being connected to the rings, and the rings being connected to the armature by means including terminals extending axially through the rings.

5. A dynamo-electric machine comprising a yoke, a shaft coaxial therewith, an armature disposed on the shaft for rotation within the yoke, a plurality of transformers on the shaft, and a plurality of flat, annular interconnecting rings disposed edgewise on the shaft, the secondary windings of the transformers being connected to the rings, and the rings being connected to the armature.

6. A dynamo-electric machine comprising a yoke, a shaft coaxial therewith, an armature disposed on the shaft for rotation within the yoke, a plurality of transformers on the shaft, a commutator on the shaft connected with the armature, said transformers and commutator being both disposed on the same side of said yoke, connections from said transformers to said commutator, brushes and brush holders cooperating with the commutator, and terminal conductors on the side of the yoke opposite the commutator, said conductors being connected to the brush holders and extending circumferentially of the shaft.

7. A dynamo-electric machine comprising a yoke, a shaft coaxial therewith, an armature disposed on the shaft for rotation within the yoke, a plurality of transformers on the shaft, a commutator on the shaft connected with the armature, said transformers and commutator being both disposed on the same side of said yoke, connections from said transformers to said commutator, and terminal conductors extending circumferentially of said shaft on the opposite side of the yoke from the transformers and having connections extending axially through said yoke to said commutator.

8. An electric generator adapted to generate a heavy current at low voltage comprising a yoke, a rotor mounted for rotation therein, means for collecting and delivering the current induced in said rotor including a plurality of brush holders spaced radially from and circumferentially about the axis of the rotor, and carrying brushes cooperating with conducting means mounted on and rotating with the rotor, an individual load lead in conducting relation with each of said holders, said leads extending axially of said yoke in inductive relation therewith thereby compensating the effect on the yoke of the current induced in said rotor uniformly about the circumference of the yoke, said leads extending then radially and circumferentially of the yoke substantially to a common point, and thence radially of the yoke.

JAMES V. CAPUTO.